United States Patent [19]
Schieferdecker et al.

[11] Patent Number: 5,597,957
[45] Date of Patent: Jan. 28, 1997

[54] MICROVACUUM SENSOR HAVING AN EXPANDED SENSITIVITY RANGE

[75] Inventors: Joerg Schieferdecker, Wiesbaden; Friedemann Voelklein, Jena, both of Germany

[73] Assignee: Heimann Optoelectronics GmbH, Wiesbaden, Germany

[21] Appl. No.: 361,430

[22] Filed: Dec. 21, 1994

[30] Foreign Application Priority Data

Dec. 23, 1993 [DE] Germany ............................ 43 44 256.0
Apr. 25, 1994 [DE] Germany ............................ 44 14 349.4

[51] Int. Cl.$^6$ ................................................. G01L 21/12
[52] U.S. Cl. ..................................... 73/755; 73/708
[58] Field of Search ........................................ 73/755, 708

[56] References Cited

U.S. PATENT DOCUMENTS 5,347,869  9/1994  Shie et al. ................................. 73/755

FOREIGN PATENT DOCUMENTS

3707631A1  9/1988  Germany .
3917519A1  12/1990  Germany .
4233153A1  4/1994  Germany .

OTHER PUBLICATIONS

"A suspended disk vacuum gauge", A. R. Beavitt et al, Journal of Scientific Instruments (Journal of Physics E) 1968 Series 2, vol. 1, pp. 45–51.

"Multifoil thermocouple Gauge for Measuring Pressures up to 1 atm", W. P. Teagan, Review of Scientific Instruments, vol. 39, No. 12, Dec. 1968, pp. 1897–1898.

"Double–beam integrated thermal vacuum sensor", A. W. van Herwaarden et al, Journal of American Vacuum Society Technology, vol. 5, No. 4, Jul./Aug. 1987, pp. 2454–2457.

"Performance of integrated thermopile vacuum sensors", A. W. van Herwaarden et al, in Phys. E. Sci. Instr. 21, (1988), pp. 1162–1167.

*Primary Examiner*—Richard Chilcot
*Assistant Examiner*—Joseph L. Felber
*Attorney, Agent, or Firm*—Hill, Steadman & Simpson

[57] ABSTRACT

A microvacuum sensor has an expanded sensitivity range, wherein a thin membrane having poor thermal conductivity is freely suspended on a semiconductor single-crystal. A thin metallic heating layer, preferably of aluminum, is arranged on the membrane. The membrane surface is suspended by at least one web of the membrane material. The heating layer has an extremely low emissivity of less than 0.1 in the near infrared range. A film resistor having the same temperature coefficient as the metallic heating layer is arranged on the sensor chip in the region of the solid silicon for temperature compensation of temperature fluctuations. Members having a planar mirrored wall are arranged parallel to the surfaces of the membrane at a spacing of less than 5 μm from the membrane. These members act as a heat sink relative to the membrane. Gas from the environment of the sensor can freely circulate between the membrane and the wall surfaces.

18 Claims, 3 Drawing Sheets

MICROVACUUM SENSOR HAVING AN EXPANDED SENSITIVITY RANGE

BACKGROUND OF THE INVENTION

The present invention is directed to a planar microvacuum sensor based on the principle of thermal conductivity.

Conventional thermal conductivity vacuum gauges are based on the measurement of the pressure-dependent heat elimination of a thinned gas with the assistance of an electrically heated wire erected in the vacuum and have been known as prior art for a long time. Thermal-electrical microvacuum sensors having thin-film heating elements that are manufactured with microtechnological manufacturing methods are also known (for example, A. W. Herwaarden et al., "Small-Size Vacuum Sensors Based on Silicon Thermopiles", in Sensors and Actuators A, 25–27, 1991, 565–569). In these vacuum sensors, a self-supporting membrane or a freely suspended beam of single-crystal silicon is erected on which the thermal-electrical materials and heating films are produced by implantation of the silicon or, respectively, by thin-film deposition. The basic principle of the radiant thermopile is thereby utilized, whereby the interconnects (thermo-legs) produced in thin-film technology for the two different thermal-electrical materials are connected in series such that contacts arise in alternation in the central part of the membrane or on the beam (what are referred to as "hot" contacts) and on the basic silicon member (what are referred to as "cold" contacts). By introducing a heat flow at the "hot" contacts with the heating layer, a temperature increase of these "hot" contacts arises compared to the "cold" contacts on the basic silicon member serving as heat sink. The temperature difference between the "hot" and the "cold" contacts is dependent on the thermal conduction of the gas that surrounds the sensor chip. This thermal conduction decreases with reduced gas pressure and the thermal-electrical signal voltage increases.

A microvacuum sensor wherein the heating wire is provided as a meander-shaped, thin layer of platinum on a thin $SiO_2$ membrane that is suspended free-floating at four webs of the same $SiO_2$ is also known (Ping Kuo Wang, Jin-Shown Shie, "Micro-Pirani Vacuum Gague" Rev Sci Instr 65 (2), 1994, 492) The membrane, which is located on a single-crystal silicon wafer, is prepared by anisotropic etching of the silicon. A pyramidal etched trench whose depth is determined by the dimensioning of the membrane and amounts to a few hundred micrometers arises under the membrane as a result of the etching process.

The pressure sensitivity of the described vacuum sensors is fundamentally limited by the following effects:

Toward high pressures, the thermal conduction by the surrounding gas becomes independent of pressure (and, thus, so does the sensor) as soon as the average free path length of the gas becomes smaller than the spacing of the heated surface (for example, the surface of the heating wire, the membrane or beam surface) from the surfaces of the unheated environment. A sensor chip freely positioned in the vacuum or, respectively, a chip having a typical chip thickness of approximately 500 μm secured on a base loses its pressure sensitivity at approximately 10 mbar for said reasons. Thermal conductivity sensors of the described type can therefore not be employed for exact pressure measurements in a low vacuum between 50–1013 mbar.

In the direction toward low pressures, the thermal conduction through the surrounding gas decreases proportionally relative the pressure. In conventional heating wire vacuum gauges, this thermal conduction by the gas already becomes lower than the (pressure-dependent) heat output of the heating wire as a consequence of thermal radiation and as a consequence of thermal conduction via the wire suspension given pressures around $10^{-3}$ mbar. These vacuum gauges are therefore pressure-insensitive below $10^{-3}$ mbar.

SUMMARY OF THE INVENTION

An object of the invention is to specify an economically manufacturable microvacuum sensor based on the principle of thermal conductivity having an expanded sensitivity range from $10^{-5}$–$10^3$ mbar and having high measuring precision that can be heated up to temperatures of 400° C.

In general terms the present invention is a microvacuum sensor having an expanded sensitivity range, wherein a thin membrane having poor thermal conductivity is freely suspended on a semiconductor single-crystal. A thin metallic heating layer, preferably of aluminum, is arranged on the membrane. The membrane surface is suspended by one or more webs of the membrane material or of a material having a lower thermal conductivity and, preferably, having the thickness of the membrane or a lesser thickness. The condition $l=c/2$ is realized as optimum dimensioning proceeding from one or two side centers lying opposite one another along a center line of the sensor for sensor structures having a web connection of a heater to the bond surfaces. The term c is the side length of the membrane area and l is essentially the differential length between c and the heater side length in the direction of c. The condition $l=c/6$ is realized as optimum dimensioning given sensor structures wherein the web connection of the heater to the bond surfaces ensues along a diagonal of the sensor or wherein a membrane lying thereon on all sides without a web suspension is utilized. The heating layer has an extremely low emissivity less than 0.1 in the near infrared range. A film resistor having the same temperature coefficient as the metallic heating layer is arranged on the sensor chip in the region of the solid silicon for temperature compensation of temperature fluctuations. Members having a planar mirrored wall are arranged parallel to the surfaces of the membrane at a spacing of less than 5 μm from the membrane. These members act as a heat sink relative to the membrane. Gas from the environment of the sensor can freely circulate between the membrane and the wall surfaces.

The following are advantageous developments of the present invention.

The wall surfaces are manufactured by anisotropic etching of silicon wafers having the same thickness as in the chip manufacture and, for example, are joined to the wafer of the sensor chip by anodic bonding.

At least one of the wall surfaces is shaped from a metallic material by deep-drawing, coining, casting or similar methods and is subsequently mounted onto the sensor chip.

One of the wall surfaces is fashioned in the sensor chip itself, whereby the interspace between chip membrane and wall surface is formed by a sacrificial layer that is selectively removed relative to the membrane by etching. The interspace is connected to the outside atmosphere by aeration channels in the membrane.

IC-compatible materials are used, such as silicon, aluminum, silicon nitride or, respectively, silicon dioxide having a heatability of the sensor up to temperatures of 400° C.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

The extension of the sensitivity toward lower pressures down to $10^{-5}$ mbar is achieved by the following features:

It is necessary that the ratio $G_{gas}(p)/(G_{St}+G_L)$ of the pressure-dependent thermal conductivity as a consequence of gas thermal conduction $G_{gas}(p)$ and the sum of the thermal conductivities as a consequence of radiation $G_{St}$ and thermal conduction as a result of the material of the heating wire $G_L$ be as great as possible. This object is inventively achieved in that the heating wire, as a thin film having an optimally low emission coefficient, is arranged on an extremely thin and poorly thermally conductive substrate having optimized geometry.

Figure 1:
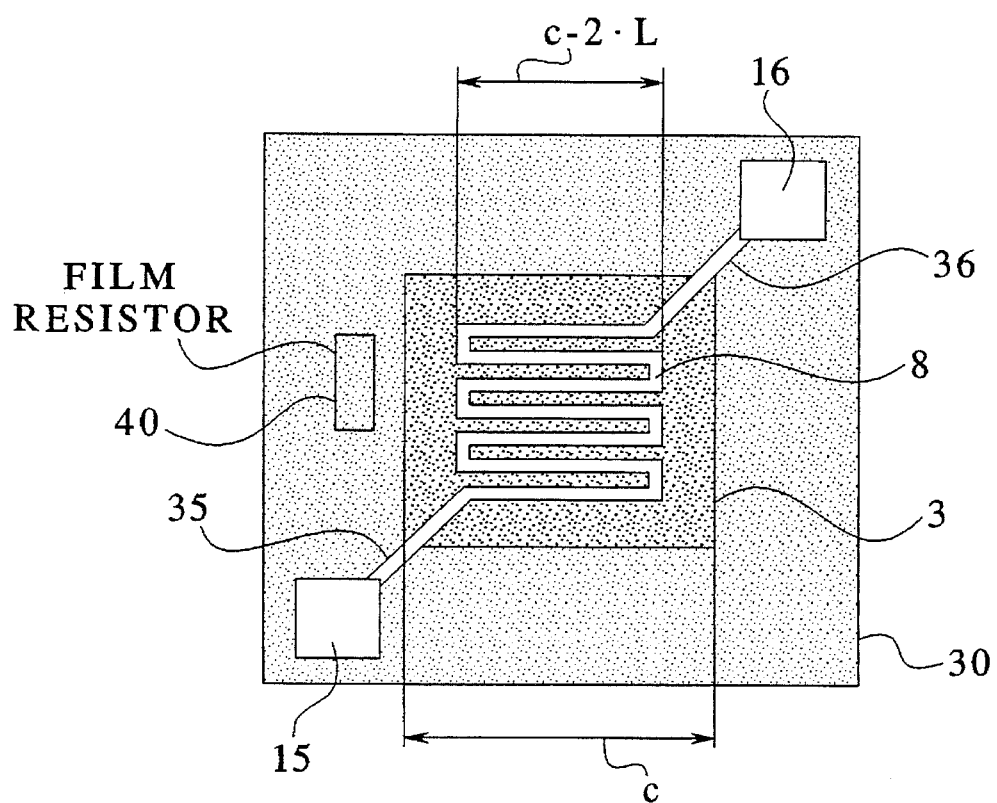
FIG. 1 depicts a first embodiment of the present invention.

In a first embodiment of FIG. 1, this substrate is preferably composed of a thin, quadragonal $SiO_2$ and/or $Si_3N_4$ membrane 3 having the edge length c that is arranged as a closed membrane on a single-crystalline wafer 30 and is prepared by anisotropic etching of the wafer proceeding from the backside. A meander-shaped heating layer 8, preferably of aluminum, is located in the central part of this membrane 3, the expanse thereof likewise filling a quadragonal area having the edge length c−2·l. The leads 35, 36 to the outer bond surfaces 15 and 16 are likewise formed of thin and extremely narrow, micro-structured aluminum layers so that the thermal conductivity $G_L$ is minimized by the extremely small cross section of the leads and only little heat is eliminated to the solid silicon chip.

As a consequence of the temperature coefficient of its electrical impedance, the heating of the heating layer 8 dependent on the gas pressure leads to a resistance of the heating layer 8 that is dependent on the gas pressure. For example, this is converted into a voltage signal dependent on pressure in a Wheatstone bridge circuit. Temperature fluctuations of the sensor chip given this measuring principle lead to undesired fluctuations of the pressure indication and, thus, to low measuring precision. The object of high measuring precision is inventively achieved in that a film resistor 40 is arranged in the region of the solid silicon, this film resistor being formed micro-technologically of the same aluminum layer as the heating layer resistor and, thus, having the same temperature coefficient as the heating layer and therefore assuring the compensation of undesired temperature fluctuations of the chip.

Figure 2A:
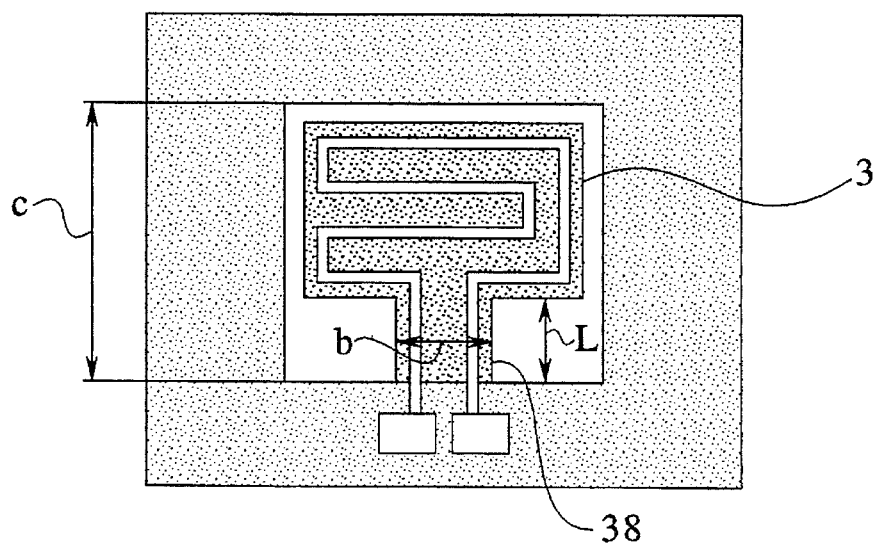
FIG. 2a depicts another embodiment of the present invention with a single web.
Figure 2B:
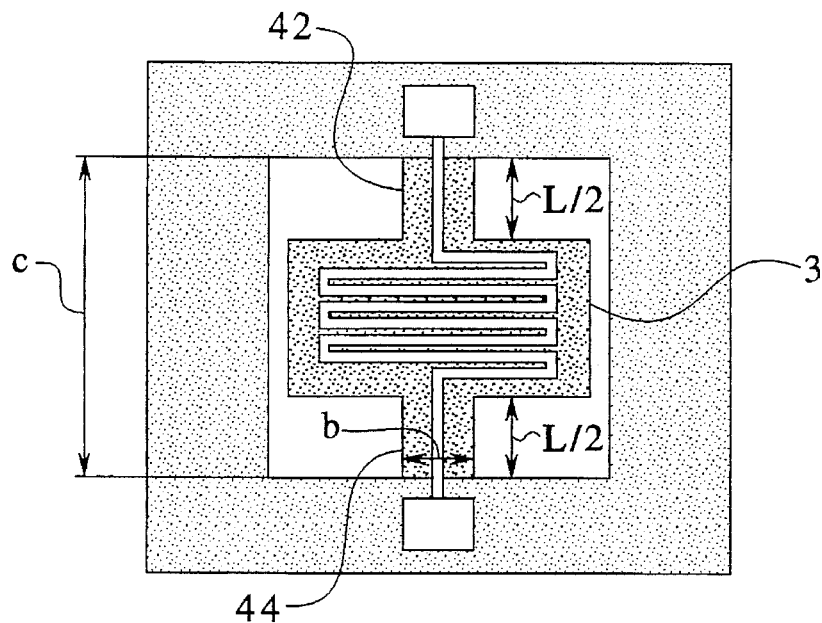
FIG. 2b depicts an embodiment with two webs.
Figure 2C:
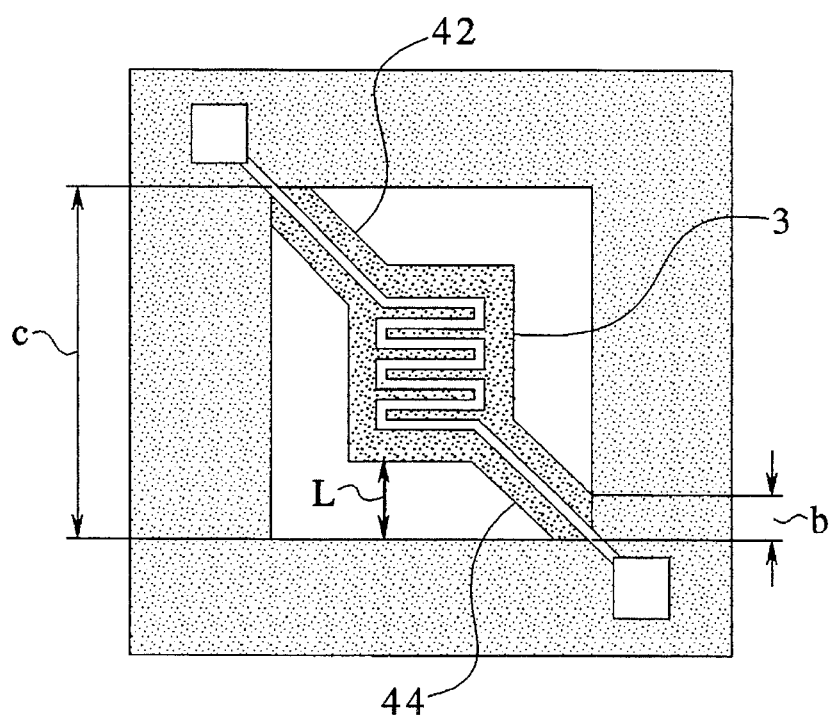
FIG. 2c depicts an embodiment having a web with predetermined length and width.

FIGS. 2a–2c show a second inventive embodiment of the vacuum sensor chip in a plan view. Here, the membrane 3 is suspended at one or more webs of, preferably, the membrane material or of a material having lower thermal conductivity and, preferably, having the membrane thickness or a lower thickness. FIG. 2a shows the suspension at a single web 38; FIG. 2b shows a suspension at two webs 42, 44. For sensor structures according to FIGS. 2a and 2b, the overall web length is established by l, the web width is established by b (b<<c) and the membrane area is established by $(c^2-l \cdot c)$. For sensor structures according to FIG. 2c, the web length is established by $\sqrt{2} \cdot l$, the web width is established by $\sqrt{2} \cdot b$ (with b<<c) and the membrane area is established by $(c-2\cdot)^2$. Since the thermal conductivity $G_{gas}(p)$ and the radiant conductivity $G_{St}$ are proportional to the heated membrane area and the thermal conductivity $G_L$ is inversely proportional to the length l, there is a geometrical maximum for the ratio $G_{gas}(p)/(G_{St}+G_L)$ and, thus, for the pressure sensitivity at low pressures. Maximum pressure sensitivity for structures of the type of FIG. 1 and FIG. 2c is realized by the conduction l=c/6 and is realized by l=c/2 for structures of the type of FIGS. 2a and 2b.

The extension of the sensitivity at high pressures up to $10^3$ mbar is inventively achieved in that a respective unheated walls 4, 17 having at least the size of the membrane is realized as heat sink at both sides parallel to the membrane at a slight spacing of less than 5 μm, so that a gas-filled gap having the above-recited width arises between membrane and wall 4, 17. Inventively, these walls are manufactured by anisotropic etching of silicon wafers having the same thickness as in the sensor manufacture and, for example, are joined to the sensor chip and to the chip base by anodic bonding.

In another embodiment, at least one wall is shaped of a metallic material by deep-drawing, coining, casting or similar methods and is subsequently mounted on the sensor chip. In a further embodiment, the wall located under the membrane is formed by the silicon chip itself, whereby the interspace between membrane and silicon carrier is freed by etching what is referred to as a sacrificial layer.

The effect of the invention for expanding the sensitivity toward high pressures is based on the following cause:

The thermal conduction from the heated membrane is defined, among other things, by the pressure-dependent thermal conductivity $G_{gas}(p)$ that derives from the thermal conductivity of the gas, from the membrane area and from its spacing from neighboring, unheated surfaces. Given spacings of less than 0.5 μm, of a type typical for sensor housings, this thermal conductivity already becomes pressure independent at pressures of approximately 10 mbar. In the solution of the invention having spacings of less than 5 μm, however, the pressure-dependency of the thermal conductivity is preserved to pressures of approximately $10^3$ mbar.

A reflective mirroring of the wall surfaces 4, 17 leads to the fact that the radiant conductivity $G_{St}$ of the sensor is reduced. In addition to the measures already set forth, this thus improves the pressure sensitivity given low pressures.

Figure 3:
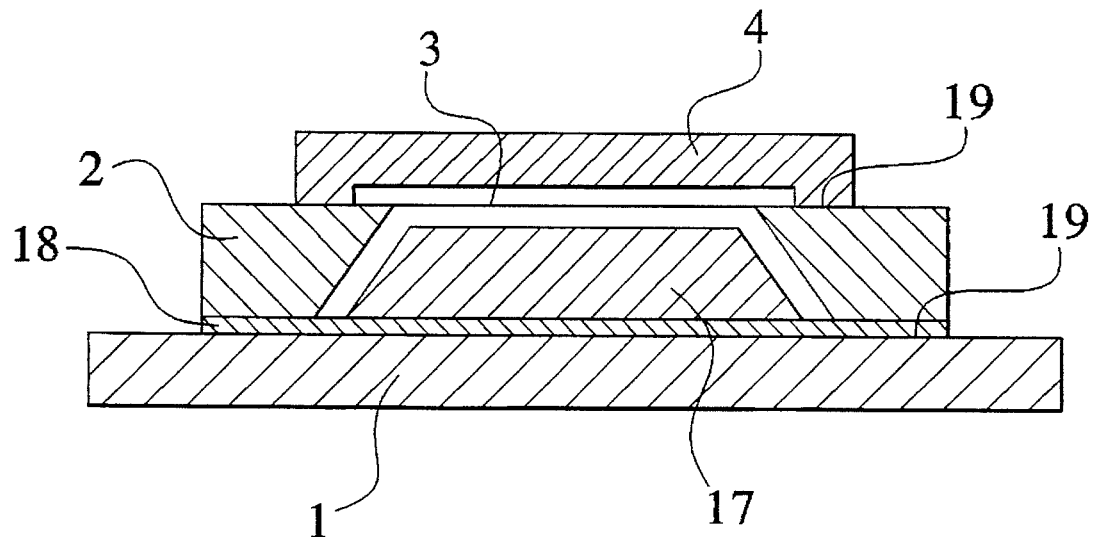
FIG. 3 is a cross-sectional view of a further embodiment of the present invention.

In an embodiment of FIG. 3, a Si chip 2 shaped by anisotropic etching is mounted on a carrier 1. Only a thin membrane 3, that is usually composed of silicon nitride and/or silicon dioxide and that is approximately 1 μm thick and that has low thermal conductivity, is located in the central part of the chip 2.

An aluminum heating layer is structured on the membrane in thin-film technology (for example, by sputtering) and a compensation layer having a thickness of a few hundred μm is structured on the solid silicon. A bridge wall surface 4 acting as heat sink is located close above the membrane 3 at a spacing of less than 5 μm. A member wall surface 17 acting as heat sink is additionally arranged under the membrane at a spacing of, likewise, less than 5 μm. The interspaces between the membrane 3 and the heat sinks 4 and 17 must have direct access to the surrounding gas.

The defined spacing between membrane 3 and member 17 can be realized, for example, in that the Si chip 2 shaped by anisotropic etching and having the membrane 3 is mounted on a further Si chip 17 that is likewise shaped by anisotropic etching. A shoulder is created by the known utilization of an additional etch stop layer 18 (for example, an epitaxially grown Si layer doped with a high boron concentration), so that the spacing between membrane 3 and heat sink 17 is defined. A mounting of the two chips 2 and 17 in a wafer union also becomes possible due to this shoulder. This mounting in the wafer union can ensue, for example, by anodic bonding.

The defined spacing between membrane and bridge 4 is realized in that this bridge is either formed by a structure-etched Si chip that is mounted by anodic bonding in the wafer union or metallic deep-drawn or, respectively, pressed, coined or cast parts are glued onto the chip 2 in discrete mounting. An unimpeded access of the gas to the interspaces under and over the membrane is accomplished here by aeration channels 19 that are shown covered.

Figure 4:
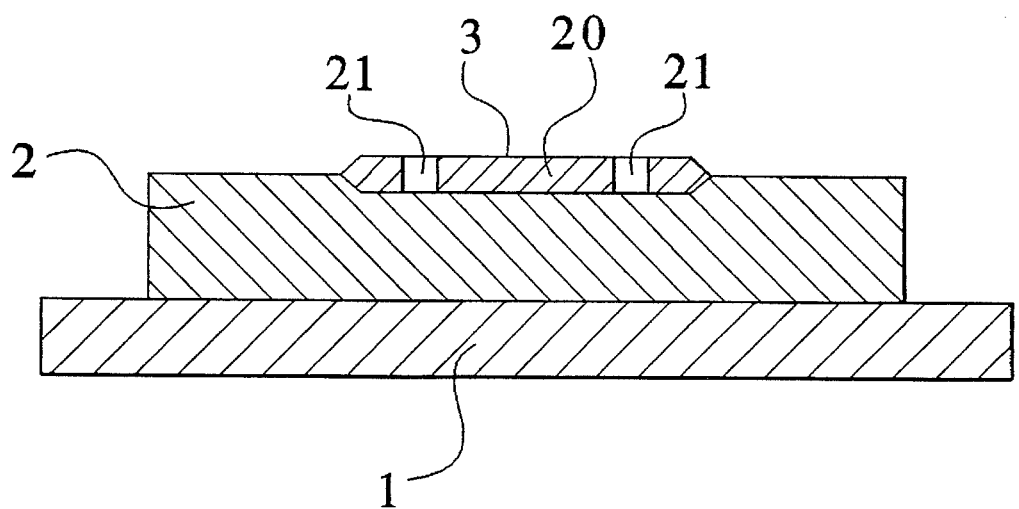
FIG. 4 is a cross-sectional view of yet another embodiment of the present invention.

FIG. 4 shows a further embodiment wherein the lower heat sink is produced in the chip 2 that carries the membrane 3.

The point of departure is the known sacrificial layer technology wherein a sacrificial layer 20 (for example, silicon dioxide) is produced on the chip 2, a thin membrane 3 being deposited on this sacrificial layer 20. The membrane is interrupted at a number of locations, so that channels 21 to the sacrificial layer are formed. A cavity arises under the membrane due to an etchant attack that selectively etches the sacrificial layer relative to the membrane, this cavity being connected to the surrounding atmosphere by the channels 21. The spacing between membrane and heat sink (the Si substrate lying therebelow in this case) can be set reproducibly and very small (for example, only a few μm thick) in this way.

The heatability of the microvacuum sensor up to temperatures of 400° C. is inventively effected by the IC-compatible materials of silicon, aluminum, silicon nitride or, respectively, silicon dioxide that are inventively employed, these having a temperature resistance far higher than 400° C.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A microvacuum sensor having an expanded sensitivity range, comprising:

a thin membrane, having poor thermal conductivity, freely suspended on a sensor chip of a semiconductor single-crystal, the membrane surface being suspended by at least one web of the membrane material or of a material having a lower thermal conductivity and having the thickness of the membrane or a lesser thickness, where the sensor is constructed to obey the condition L=c/2 dimensioning proceeding from one or two side centers lying opposite one another along a center line of the sensor for sensor structures having a web connection of a heater to bond surfaces on the sensor chip, c being a side length of a membrane area of the membrane and L being substantially a differential length between c and a heater side length of the heater in a direction of c, and where the sensor is constructed to obey the condition L=c/6 given sensor structures having a web connection of the heater to the bond surfaces that ensues along a diagonal of the sensor or having a membrane without a web suspension on any side of the membrance;

a thin metallic heating layer arranged on the membrane, the heating layer forming the heater and the heating layer having an extremely low emissivity of less than 0.1 in a near infrared range;

a film resistor, having substantially the same temperature coefficient as the metallic heating layer, arranged on the sensor chip in a region adjacent to the membrance for temperature compensation of temperature fluctuations;

members having planar mirrored walls arranged parallel to surfaces of the membrane at a spacing of less than 5 μm from the membrane, said members acting as heat sinks relative to the membrane; and wherein gas from the environment of the sensor freely circulates between the membrane and surfaces of the walls of the members.

2. The microvacuum sensor according to claim 1, wherein the walls of the members are manufactured by anisotropic etching of silicon wafers that have the same thickness as a silicon wafer used in the manufacture of the sensor chip, the walls being joined to the wafer of the sensor chip.

3. The microvacuum sensor according to claim 2, wherein the walls of the members are joined to the wafer of the sensor chip by anodic bonding.

4. The microvacuum sensor according to claim 1, wherein at least one of the walls is shaped from a metallic material by one of deep-drawing, coining, casting and similar methods, and is subsequently mounted onto the sensor chip.

5. The microvacuum sensor according to claim 1, wherein one respective wall of the walls is fashioned in the sensor chip itself, wherein a respective interspace between the membrane and the respective wall is formed by a sacrificial layer that is selectively removed relative to the membrane by etching, wherein the respective interspace is connected to the outside atmosphere by aeration channels in the membrane.

6. The microvacuum sensor according to claim 1, wherein the microvacuum sensor utilizes IC-compatible materials selected from the group of silicon, aluminum, silicon nitride and silicon dioxide, said IC-compatible materials having a heatability of the sensor up to temperatures of 400° C.

7. A microvacuum sensor having an expanded sensitivity range, comprising:

a thin membrane, having poor thermal conductivity, freely suspended on a sensor chip of a semiconductor single-crystal, the membrane surface being suspended by at least one web of a material having at most a thermal conductivity of the membrane and having at most a thickness of the membrane, where the sensor is constructed to obey the condition L=c/2 proceeding from one or two side centers lying opposite one another along a center line of the sensor for sensor structures having a web connection of a heater to bond surfaces on the sensor chip, c being a side length of a membrane area of the membrane and L being substantially a differential length between c and a heater side length of the heater in a direction of c, and where the sensor is constructed to obey the condition L=c/6 given sensor structures having a web connection of the heater to the bond surfaces that ensues along a diagonal of the sensor or having a membrane without a web suspension on any side of the membrane;

a thin metallic heating layer arranged on the membrane, the heating layer forming the heater and the heating layer having an extremely low emissivity of less than 0.1 in a near infrared range;

a film resistor, having substantially the same temperature coefficient as the metallic heating layer, arranged on the sensor chip in a region adjacent to the membrane for temperature compensation of temperature fluctuations;

members having planar walls arranged parallel to surfaces of the membrane at a spacing of less than 5 μm from the membrane, said members acting as heat sinks relative to the membrane; and wherein gas from the environment of the sensor freely circulates between the membrane and surfaces of the walls of the members.

8. The microvacuum sensor according to claim 7, wherein the walls of the members are manufactured by anisotropic etching of silicon wafers that have the same thickness as a silicon wafer used in the manufacture of the sensor chip, the walls being joined to the wafer of the sensor chip.

9. The microvacuum sensor according to claim 8, wherein the walls of the members are joined to the wafer of the sensor chip by anodic bonding.

10. The microvacuum sensor according to claim 7, wherein at least one of the walls is shaped from a metallic material by one of deep-drawing, coining, casting and similar methods, and is subsequently mounted onto the sensor chip.

11. The microvacuum sensor according to claim 7, wherein one respective wall of the walls is fashioned in the sensor chip itself, wherein a respective interspace between the membrane and the respective wall is formed by a sacrificial layer that is selectively removed relative to the membrane by etching, wherein the respective interspace is connected to the outside atmosphere by aeration channels in the membrane.

12. The microvacuum sensor according to claim 7, wherein the microvacuum sensor utilizes IC-compatible materials selected from the group of silicon, aluminum, silicon nitride and silicon dioxide, said IC-compatible materials having a heatability of the sensor up to temperatures of 400° C.

13. A microvacuum sensor having an expanded sensitivity range, comprising:

a thin membrane, having poor thermal conductivity, freely suspended on a sensor chip of a semiconductor single-crystal, the membrane surface being suspended by at least one web of the membrane material, where the sensor is constructed to obey the condition $L=c/2$ proceeding from one or two side centers lying opposite one another along a center line of the sensor for sensor structures having a web connection of a heater to bond surfaces on the sensor chip, c being a side length of a membrane area of the membrane and L being substantially a differential length between c and a heater side length of the heater in a direction of c, and where the sensor is constructed to obey the condition $L=c/6$ given sensor structures having a web connection of the heater to the bond surfaces that ensues along a diagonal of the sensor or having a membrane without a web suspension on any side of the membrane;

a thin metallic heating layer of aluminum, arranged on the membrane, the heating layer forming the heater and the heating layer having an extremely low emissivity of less than 0.1 in a near mirror infrared range;

a film resistor, having the same temperature coefficient as the metallic heating layer, arranged on the sensor chip in a region adjacent to the membrane for temperature compensation of temperature fluctuations;

first and second members, each having a planar mirrored wall arranged parallel to the membrane at a spacing of less than 5 μm from the membrane, said first and second members acting as heat sinks relative to the membrane, said first and second members being adjacent opposite surfaces of the membrane; and wherein gas from the environment of the sensor freely circulates between the membrane and surfaces of the walls of the members.

14. The microvacuum sensor according to claim 13, wherein the walls of the members are manufactured by anisotropic etching of silicon wafers that have the same thickness as a silicon wafer used in the manufacture of the sensor chip, the walls being joined to the wafer of the sensor chip.

15. The microvacuum sensor according to claim 13, wherein the walls of the members are joined to the wafer of the sensor chip by anodic bonding.

16. The microvacuum sensor according to claim 13, wherein at least one of the walls is shaped from a metallic material by one of deep-drawing, coining, casting and similar methods, and is subsequently mounted onto the sensor chip.

17. The microvacuum sensor according to claim 13, wherein one respective wall surface of the walls is fashioned in the sensor chip itself, wherein a respective interspace between the membrane and the respective wall is formed by a sacrificial layer that is selectively removed relative to the membrane by etching, wherein the respective interspace is connected to the outside atmosphere by aeration channels in the membrane.

18. The microvacuum sensor according to claim 13, wherein the microvacuum sensor utilizes IC-compatible materials selected from the group of silicon, aluminum, silicon nitride and silicon dioxide, said IC-compatible materials having a heatability of the sensor up to temperatures of 400° C.

* * * * *